United States Patent [19]

Chinen

[11] Patent Number: 5,675,610
[45] Date of Patent: Oct. 7, 1997

[54] DIGITAL DATA ENCODING APPARATUS AND METHOD THEREOF

[75] Inventor: Toru Chinen, Tokyo, Japan

[73] Assignee: Nippon Steel Corporation, Tokyo, Japan

[21] Appl. No.: 697,729

[22] Filed: Aug. 29, 1996

[30] Foreign Application Priority Data

Aug. 31, 1995 [JP] Japan ................................ 7-246954

[51] Int. Cl.$^6$ .................................................. H04K 1/10
[52] U.S. Cl. ...................... 375/260; 375/240; 370/477; 370/480; 395/2.91; 395/2.94; 348/388; 386/112
[58] Field of Search ..................... 370/210, 281, 370/295, 302, 343, 464, 477, 480, 484, 521, 536, 542; 375/240, 260, 377; 395/2, 214–219, 2.38, 2.39, 2.91, 294; 348/384, 388, 395, 398; 386/126, 109, 112

[56] References Cited

U.S. PATENT DOCUMENTS 5,583,962  12/1996  Davis et al. ........................ 395/2.38
5,596,421  1/1997  Shibata et al. ..................... 386/126

OTHER PUBLICATIONS

Co-pending U.S. Patent Application SN. 08/697,728.
Furui et al., Advances in Speech Signal Processing, Marcel Dekker, Inc., pp. 109–141, 1991.
Princen et al., Analysis/Synthesis Filter Bank Design Based On Time Domain Aliasing Cancellation, IEEE Transaction on Acoustic, Speech, and Signal Processing, ASSP-34, No. 5, pp. 1153–1161, Oct. 1986.

*Primary Examiner*—Stephen Chin
*Assistant Examiner*—Amanda T. Le
*Attorney, Agent, or Firm*—Pollock, Vande Sande & Priddy

[57] ABSTRACT

A first and second channel digital data are transformed into data, respectively, on a frequency axis on a block-by-block basis to thereby generate a first and second channel coefficient data on a frequency-by-frequency basis. It is detected on a frequency-by-frequency basis whether or not sign of the first channel coefficient data coincides with that of the second channel coefficient data, wherein unless both of them are met, either the sign of the first channel coefficient data or that of the second channel coefficient data is inverted. Mean values of the first channel coefficient data and the second channel coefficient data both of which have the respective signs made to coincide with each other are determined to thereby generate shared-channel data. The shared-channel data is divided into a plurality of sub-bands each of which contains a single or a plurality of the shared-channel data. The shared-channel data divided undergoes a floating-point transform on a subband basis for thereby generating one subband-common exponent data and a plurality of mantissa data.

22 Claims, 7 Drawing Sheets

DIGITAL DATA ENCODING APPARATUS AND METHOD THEREOF

BACKGROUND OF THE INVENTION

1. Field of the Invention

The present invention relates to a digital data encoding apparatus and a method therefor and more particularly the invention is concerned with a digital data encoding apparatus and a method therefor capable of encoding digital audio data with high efficiency.

2. Description of Related Art

As the high-efficiency encoding methods for realizing compression of audio information data, there may be mentioned a sub-band coding method according to which the audio data are divided into a plurality of sub-bands on a time axis upon encoding the audio data, and a transform coding method according to which the audio data undergo orthogonal transform to be transformed into data on a frequency axis. Additionally, there is also known a high-efficiency encoding method according to which the audio data are first divided into a plurality of sub-bands on the time axis by resorting to the subband coding method, whereon the sub-band signals are subject to the orthogonal transform to be thereby transformed into the data on the frequency axis by adopting the transform coding method.

In the following, a transform coding method in which a MDCT (Modified Discrete Cosine Transform) is adopted for encoding right and left channel audio data of stereophonic sound will be reviewed, by way of example.

Digital audio data of each channel is divided into blocks each for 512 samples in such manner that the second half of the data of a preceding block becomes identical or coincident with the data of the first half of a current block (a so-called 50% overlap processing). Additionally, the digital audio data of each channel undergo a windowing processing (weighting processing) every block.

The digital audio data of each channel divided into the blocks then undergoes the modified discrete cosine transform on a block-by-block basis to be thereby transformed into 256 modified discrete cosine transform coefficient data (i.e., data on the frequency axis). Incidentally, the modified discrete cosine transform coefficient data will hereinafter be referred to as the MDCT coefficient data.

For realizing the data compression, 240 MDCT coefficient data for lower frequencies out of the 256 right-channel MDCT coefficient data and 240 MDCT coefficient data for lower frequencies out of the 256 left-channel MDCT coefficient data are added together on a frequency-by-frequency basis and then the sum resulting from the addition is divided by "2" to be thereby averaged. Thus, 240 averaged MDCT coefficient data (referred to as the shared-channel data) are derived. Further, there are made available channel shared information for the right channel and that for the left channel, both of which are made use of for decoding the encoded data by a decoder. In this way, a so-called channel sharing can be realized.

Each of the 240 averaged MDCT coefficient data then undergoes a floating-point transform processing to be thereby transformed into exponent data and mantissa data. In that case, the 240 averaged MDCT coefficient data are divided into a plurality of sub-bands each containing one or a plurality of averaged MDCT coefficient data to be subsequently transformed into one exponent data (subband-common exponent data) and at least one mantissa data, respectively, on a sub-band basis.

The mantissa data is transformed into quantized mantissa data constituted by a number of bits which is equal or equivalent to a quantizing bit length determined on the basis of the subband-common exponent data. In more concrete, let's assume, by way of example, that the mantissa data is "1100101" and that the quantizing bit length as determined is "4". Then, the mantissa data of "1100101" is converted into the quantized mantissa data consisting of only the four bits as counted from the most significant bit or MSB (i.e., "1100"). The subband-common exponent data and the quantized mantissa data may be stored on a recording medium and/or transmitted through a transmission path.

However, with the transform coding method described above, it is noted the averaged MDCT coefficient data can assume a value approximating to 0 (zero) when the right-channel MDCT coefficient data and the left-channel MDCT coefficient data have respective absolute values substantially equal to each other with the signs thereof differing from each other, because the right-channel MDCT coefficient data and the left-channel MDCT coefficient data are added together and the resulting sum is divided by "2" for generating the averaged MDCT coefficient data. Thus, when the averaged MDCT coefficient data has a value approximating to 0 (zero) and when correlation between the right-channel MDCT coefficient data and the left-channel MDCT coefficient data is small, reconstruction of the right-channel MDCT coefficient data and the left-channel MDCT coefficient data by the decoder on the basis of the channel shared information, the subband-common exponent data and the quantized mantissa data will be accompanied with remarkable error, which gives rise to a problem that the tone quality is degraded.

SUMMARY OF THE INVENTION

Accordingly, an object of the present invention is to provide a digital data encoding apparatus and a method therefor which can suppress or prevent degradation of the tone quality upon decoding by a decoder even when right-channel MDCT coefficient data and left-channel MDCT coefficient data, for example, have respective absolute values approximately equal to each other and the signs differing from each other.

Another object of the present invention is to provide a digital data encoding apparatus and a method therefor which can ensure prevention or suppression of degradation of the tone quality upon decoding by a decoder even when the correlation between the right-channel MDCT coefficient data and the left-channel MDCT coefficient data, for example, is of a small value.

A first digital data encoding apparatus according to the present invention is for encoding first channel digital data divided into blocks each containing a predetermined number of samples and second channel digital data divided into blocks each containing said predetermined number of samples, which apparatus includes a coefficient data generating means for transforming said first channel digital data into data on a frequency axis on a block-by-block basis to thereby generate first channel coefficient data on a frequency-by-frequency basis while transforming said second channel digital data into data on the frequency axis on a block-by-block basis to thereby generate second channel coefficient data on a frequency-by-frequency basis, a sign inverting means for detecting on a frequency-by-frequency basis whether or not sign of said first channel coefficient data coincides with that of said second channel coefficient data, wherein unless the sign of said first channel coefficient data coincides with that of said second channel coefficient data, said sign inverting means inverting either the sign of said first channel coefficient data or that of said second channel coefficient data, to thereby make the sign of said first channel coefficient data coincide with that of said second channel coefficient data, a channel sharing means for determining mean values of said first channel coefficient data and said second channel coefficient data both of which have the respective signs made to coincide with each other by said sign inverting means, to thereby generate shared-channel data, and a floating-point transform means supplied with said shared-channel data as input thereto from said channel sharing means for dividing said inputted shared-channel data into a plurality of sub-bands each containing a single or a plurality of said inputted shared-channel data, to allow said divided shared-channel data to undergo a floating-point transform on a subband basis for thereby generating a single subband-common exponent data which is common to said divided shared-channel data contained in each of said sub-bands and a number of mantissa data, said number being equal to that of said divided shared-channel data contained in each of said sub-bands.

A second digital data encoding apparatus according to the present invention is for encoding first channel digital data divided into blocks each containing a predetermined number of samples and second channel digital data divided into blocks each containing said predetermined number of samples, which apparatus includes a coefficient data generating means for transforming said first channel digital data into data on a frequency axis on a block-by-block basis, to thereby generate first channel coefficient data on a frequency-by-frequency basis while transforming said second channel digital data into data on the frequency axis on a block-by-block basis to thereby generate second channel coefficient data on a frequency-by-frequency basis, a channel sharing means for determining mean values of said first channel coefficient data and said second channel coefficient data to thereby generate shared-channel data, a channel sharing/non-sharing decision means for determining a degree of correlation between said first channel coefficient data and said second channel coefficient data to thereby make decision as to which of said shared-channel data and said first and second channel coefficient data is to be selected in dependence on said determined degree of correlation, a switch means for selecting either said shared-channel data inputted from said channel sharing means or said first and second channel coefficient data inputted from said coefficient data generating means in dependence on the result of said decision made by said channel sharing/non-sharing decision means, to thereby output as output data either said shared-channel data or said first and second channel coefficient data as selected, and a floating-point transform means inputted with said output data outputted from said switch means for dividing said inputted output data into a plurality of sub-bands each containing a single or a plurality of said inputted output data, while allowing said divided output data to undergo a floating-point transform on a subband basis for thereby generating one subband-common exponent data which is common to said divided output data contained in each of said sub-bands and a number of mantissa data, the number being equal to the number of said divided output data contained in each of said sub-bands.

A third digital data encoding apparatus according to the present invention is for encoding a first channel digital data divided into blocks each containing a predetermined number of samples and second channel digital data divided into blocks each containing said predetermined number of samples, which apparatus includes a coefficient data generating means for transforming said first channel digital data into data on a frequency axis on a block-by-block basis to thereby generate first channel coefficient data on a frequency-by-frequency basis while transforming said second channel digital data into data on the frequency axis on a block-by-block basis to thereby generate second channel coefficient data on a frequency-by-frequency basis, a sign inverting means for detecting on a frequency-by-frequency basis whether or not sign of said first channel coefficient data coincides with that of said second channel coefficient data, wherein unless the sign of said first channel coefficient data coincides with that of said second channel coefficient data, said sign inverting means inverting either the sign of said first channel coefficient data or that of said second channel coefficient data, to thereby make the sign of said first channel coefficient data coincide with that of said second channel coefficient data, a channel sharing means for determining mean values of said first channel coefficient data and said second channel coefficient data both of which have said respective signs made to coincide with each other by said sign inverting means, to thereby generate shared-channel data, a channel sharing/non-sharing decision means for determining a degree of correlation between said first channel coefficient data and said second channel coefficient data to thereby make decision as to which of said shared-channel data and said first and second channel coefficient data is to be selected in dependence on said determined degree of correlation, a switch means for selecting either said shared-channel data inputted from said channel sharing means or said first and second channel coefficient data inputted from said coefficient data generating means in dependence on the result of said decision made by said channel sharing/non-sharing decision means, to thereby output as output data either said shared-channel data or said first and second channel coefficient data as selected, and a floating-point transform means inputted with said output data outputted from said switch means for dividing said inputted output data into a plurality of sub-bands each containing a single or a plurality of said inputted output data, while allowing said divided output data to undergo a floating-point transform on a subband basis for thereby generating one subband-common exponent data which is common to said divided output data contained in each of said sub-bands and a number of mantissa data, the number being equal to the number of said divided output data contained in each of said sub-bands.

A first digital data encoding method according to the present invention is for encoding first channel digital data divided into blocks each containing a predetermined number of samples and second channel digital data divided into blocks each containing said predetermined number of samples, which method includes a first coefficient data generating step of transforming said first channel digital data into data on a frequency axis on a block-by-block basis to thereby generate first channel coefficient data on a frequency-by-frequency basis, a second coefficient data generating step of transforming said second channel digital data into data on said frequency axis on a block-by-block basis to thereby generate second channel coefficient data on a frequency-by-frequency basis, a sign inverting step of detecting on a frequency-by-frequency basis whether or not sign of said first channel coefficient data coincides with that of said second channel coefficient data, wherein unless the sign of said first channel coefficient data coincides with that of said second channel coefficient data, either said sign of said first channel coefficient data or that of said second channel coefficient data is inverted, to thereby make the sign of said first channel coefficient data coincide with that of said second channel coefficient data, a channel sharing step of determining mean values of said first channel coefficient data and said second channel coefficient data both of which have the respective signs made to coincide with each other, to thereby generate shared-channel data, and a floating-point transform step of dividing said shared-channel data into a plurality of sub-bands each containing a single or a plurality of said inputted shared-channel data, to allow said divided shared-channel data to undergo a floating-point transform on a subband basis for thereby generating one subband-common exponent data which is common to said divided shared-channel data contained in each of said sub-bands and a number of mantissa data, the number being equal to that of said divided shared-channel data contained in each of said sub-bands.

A second digital data encoding method of the present invention is for encoding first channel digital data divided into blocks each containing a predetermined number of samples and second channel digital data divided into blocks each containing said predetermined number of samples, which method includes a first coefficient data generating step of transforming said first channel digital data into data on a frequency axis on a block-by-block basis to thereby generate first channel coefficient data on a frequency-by-frequency basis, a second coefficient data generating step of transforming said second channel digital data into data on the frequency axis on a block-by-block basis to thereby generate second channel coefficient data on a frequency-by-frequency basis, a channel sharing step of determining mean values of said first channel coefficient data and said second channel coefficient, to thereby generate shared-channel data, a channel sharing/non-sharing decision step of determining a degree of correlation between said first channel coefficient data and said second channel coefficient data to thereby make decision as to which of said shared-channel data and said first and second channel coefficient data is to be selected in dependence on said determined degree of correlation, a switching step of selecting either said shared-channel data or said first and second channel coefficient data in dependence on the result of said decision made by said channel sharing/non-sharing decision step, to thereby output as output data either said shared-channel data or said first and second channel coefficient data as selected, and a floating-point transform step of dividing said output data into a plurality of sub-bands each containing a single or a plurality of said output data, to allow said divided output data to undergo a floating-point transform on a subband basis for thereby generating one subband-common exponent data which is common to said divided output data contained in each of said sub-bands and a number of mantissa data, the number being equal to that of said divided output data contained in each of said sub-bands.

A third digital data encoding method according to the present invention is for encoding first channel digital data divided into blocks each containing a predetermined number of samples and second channel digital data divided into blocks each containing said predetermined number of samples, which method includes a first coefficient data generating step of transforming said first channel digital data into data on a frequency axis on a block-by-block basis to thereby generate first channel coefficient data on a frequency-by-frequency basis, a second coefficient data generating step of transforming said second channel digital data into data on said frequency axis on a block-by-block basis to thereby generate second channel coefficient data on a frequency-by-frequency basis, a sign inverting step of detecting on a frequency-by-frequency basis whether or not sign of said first channel coefficient data coincides with that of said second channel coefficient data, wherein unless the sign of said first channel coefficient data coincides with that of said second channel coefficient data, either the sign of said first channel coefficient data or that of said second channel coefficient data is inverted, to thereby make the sign of said first channel coefficient data coincidence with that of said second channel coefficient data, a channel sharing step of determining mean values of said first channel coefficient data and said second channel coefficient data both of which have the respective signs made to coincide with each other, to thereby generate shared-channel data, a channel sharing/non-sharing decision step of determining a degree of correlation between said first channel coefficient data and said second channel coefficient data to thereby decide which of said shared-channel data and said first and second channel coefficient data is to be selected in dependence on said determined degree of correlation, a switching step of selecting either said shared-channel data or said first and second channel coefficient data in dependence on the result of said decision made in said channel sharing/non-sharing decision step, to thereby output as output data either said shared-channel data or said first and second channel coefficient data as selected, and a floating-point transform step of inputting said outputted data and dividing said output data into a plurality of sub-bands each containing a single or a plurality of said output data, to allow said divided output data to undergo a floating-point transform on a subband basis for thereby generating one subband-common exponent data which is common to said divided output data contained in each of said sub-bands and a number of mantissa data, the number being equal to that of said divided output data contained in each of said sub-bands.

DESCRIPTION OF THE PREFERRED EMBODIMENTS

Figure 1:
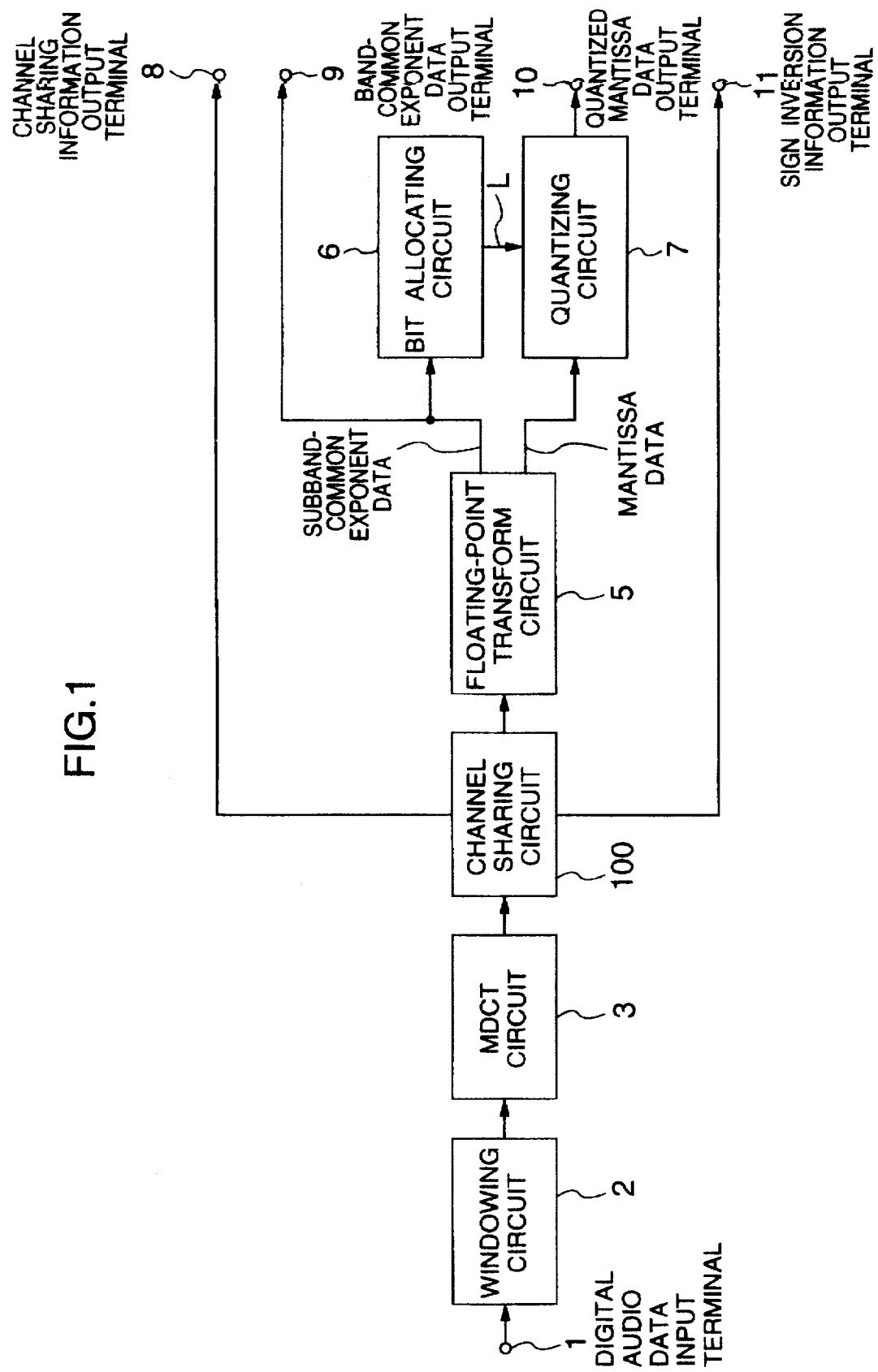
FIG. 1 is a block diagram showing a digital audio data encoding apparatus as an exemplary mode for implementing the digital data encoding apparatus according to a first embodiment of the present invention.

Referring to FIG. 1, a digital audio data encoding apparatus which implements the digital data encoding apparatus according to the first embodiment of the present invention comprises a digital audio data input terminal 1, a windowing circuit 2, a modified discrete cosine transform circuit 3 (hereinafter referred to as the "MDCT circuit 3"), a channel sharing circuit 100, a floating-point transform circuit 5, a bit allocating circuit 6, a quantizing circuit 7, a channel sharing information output terminal 8, a subband-common exponent data output terminal 9, a quantized mantissa data output terminal 10 and a sign inversion information output terminal 11. In the digital audio data encoding apparatus, the channel sharing circuit 100 shown in FIG. 2 comprises a first channel MDCT coefficient data input terminal 101, a second channel MDCT coefficient data input terminal 102, a sign inverting circuit 103, a first multiplication circuit 104, a second multiplication circuit 105, an adder circuit 106, a first division circuit 107, a second division circuit 108, a third division circuit 109, a first averaging circuit 110, a second averaging circuit 111, a first channel sharing information output terminal 112, a second channel sharing information output terminal 113 and an averaged MDCT coefficient data (shared-channel data) output terminal 114.

Inputted to the digital audio data input terminal 1 from, for example, a compact disk player (CDP) are right channel (first channel) digital audio data and left channel (second channel) digital audio data on a time division basis. In the windowing circuit 2, each of the right channel digital audio data and the left channel digital audio data is divided into blocks each for 512 samples of the digital audio data. In that case, the blockwise division of the digital audio data is so carried out that the second half of the data of a preceding block is identical with the data of the first half of a current block (a so-called 50% overlap processing). Additionally, each of the right channel digital audio data and the left channel digital audio data undergoes a windowing processing (weight imparting or weighting processing) every block.

The right channel digital audio data and the left channel digital audio data, both of which are undergone the above-mentioned windowing processing, are transformed into 256 right-channel MDCT coefficient data and 256 left-channel MDCT coefficient data (i.e., data on the frequency axis), respectively, through the modified discrete cosine transform in the MDCT circuit 3. The right-channel MDCT coefficient data and the left-channel MDCT coefficient data are then inputted from the MDCT circuit 3 to the first channel MDCT coefficient data input terminal 101 and the second channel MDCT coefficient data input terminal 102 (see FIG. 2), respectively, of the channel sharing circuit 100 independent of each other (i.e., in parallel with each other without being on a time division basis). However, because high-frequency component data out of the 256 right-channel MDCT coefficient data and 256 left-channel MDCT coefficient data, respectively, are not necessarily required, only low-frequency data, i.e., the 240 right-channel MDCT coefficient data and the 240 left-channel MDCT coefficient data are inputted to the channel sharing circuit 100. More specifically, by representing the channels by j (where j=0, 1) while representing the frequency by i (where i=0, 2, ..., 239), the right-channel MDCT coefficient data and the left-channel MDCT coefficient data inputted to the channel sharing circuit 100 can be expressed as MDCT[j][i]. Parenthetically, the right channel can be given in terms of "j=0" with the left channel being given by "j=1". Further, expression "i=0" indicates the frequency of zero, wherein greater values of i indicate correspondingly higher frequencies.

In the channel sharing circuit 100 shown in FIG. 2, operations described below are carried out.

The right-channel MDCT coefficient data and the left-channel MDCT coefficient data inputted to the first channel MDCT coefficient data input terminal 101 and the second channel MDCT coefficient data input terminal 102, respectively, are inputted to the sign inverting circuit 103. In the sign inverting circuit 103, data to be supplied to the first multiplication circuit 104 and the second multiplication circuit 105 are determined in accordance with procedure illustrated in a flow chart of FIG. 3 or FIG. 4.

At first, description will be made by reference to the flow chart shown in FIG. 3. In this case, the first multiplication circuit 104 is always supplied with the data of "+1" from the sign inverting circuit 103 while the second multiplication circuit 105 is supplied with either the data of "+1" or "−1" from the sign inverting circuit 103 in dependence on the signs of the right-channel MDCT coefficient data and that of the left-channel MDCT coefficient data. More specifically, it is detected whether or not the right-channel MDCT coefficient data MDCT[0][i] of the frequency i has a value greater than "0" (zero) inclusive thereof (step S101). When it is detected that the value of the data MDCT[0][i] is greater than zero inclusive, it is then detected whether or not the left-channel MDCT coefficient data MDCT[1][i] of the frequency i is greater than 0 (zero) inclusive thereof (step S102). When it is detected that the value of the data MDCT[1][i] is greater than 0 (zero) inclusive, data of "+1" is then supplied to the second multiplication circuit 105 (step S103). On the other hand, when it is detected in the step S102 that the data MDCT[1][i] is smaller than 0 (zero), data of "−1" is supplied to the second multiplication circuit 105 (step S104). Similarly, when the data MDCT[0][i] is detected to be smaller than 0 (zero) in the step S101, detection is then made as to whether or not the left-channel MDCT coefficient data MDCT[1][i] of the frequency i has a value greater than "0" inclusive thereof (step S105). When it is detected that the data MDCT[1][i] has a value smaller than 0 (zero), data of "+1" is supplied to the second multiplication circuit 105 (step S106). On the other hand, when it is detected in the step S105 that the data MDCT[1][i] is greater than 0 (zero) inclusive, then the data of "−1" is supplied to the second multiplication circuit 105 (step S107).

Next, description will be made by reference to the flow chart shown in FIG. 4. In this case, the second multiplication circuit 105 is constantly supplied with the data of "+1" from the sign inverting circuit 103 while the first multiplication circuit 104 is supplied with either the data of "+1" or "−1" from the sign inverting circuit 103 in dependence on the sign of the right-channel MDCT coefficient data and that of the left-channel MDCT coefficient data. More specifically, it is detected whether or not the left-channel MDCT coefficient data MDCT[1][i] of the frequency i has a value greater than "0" (zero) inclusive thereof (step S111). When it is detected that the value of the left-channel data MDCT[1][i] is greater than "0" (zero) inclusive, it is then decided whether or not the right-channel MDCT coefficient data MDCT[0][i] of the frequency i is greater than 0 (zero) inclusive thereof (step S112). When it is detected that the value of the data MDCT[0][i] is greater than 0 (zero) inclusive, data of "+1" is then supplied to the first multiplication circuit 104 (step S113). On the other hand, when it is detected in the step S112 that the data MDCT[0][i] is smaller than 0 (zero), data of "−1" is supplied to the first multiplication circuit 104 (step S114). Similarly, when the data MDCT[1][i] is detected to be smaller than 0 (zero) in the step S111, detection is then made as to whether or not the right-channel MDCT coefficient data MDCT[0][i] of the frequency i has a value greater than "0" inclusive thereof (step S115). When it is detected that the data MDCT[0][i] has a value smaller than 0 (zero), data of "+1" is supplied to the first multiplication circuit 104 (step S116). On the other hand, when it is detected in the step S115 that the data MDCT[0][i] is greater than 0 inclusive, then the data of "−1" is supplied to the first multiplication circuit 104 (step S117).

In the first multiplication circuit 104 of the channel sharing circuit 100, the right-channel MDCT coefficient data is multiplied by the data supplied from the sign inverting circuit 103, while in the second multiplication circuit 105, the left-channel MDCT coefficient data is multiplied by the data supplied from the sign inverting circuit 103. Thus, the sign of the right-channel MDCT coefficient data outputted from the first multiplication circuit 104 is made to be identical with that of the left-channel MDCT coefficient data outputted from the second multiplication circuit 105.

The right-channel MDCT coefficient data outputted from the first multiplication circuit 104 and the left-channel MDCT coefficient data outputted from the second multiplication circuit 105 are added together by the adder circuit 106 and then divided by "2" in the first division circuit 107 to be thereby transformed into averaged MDCT coefficient data (also referred to as the shared-channel data).

Figure 3:
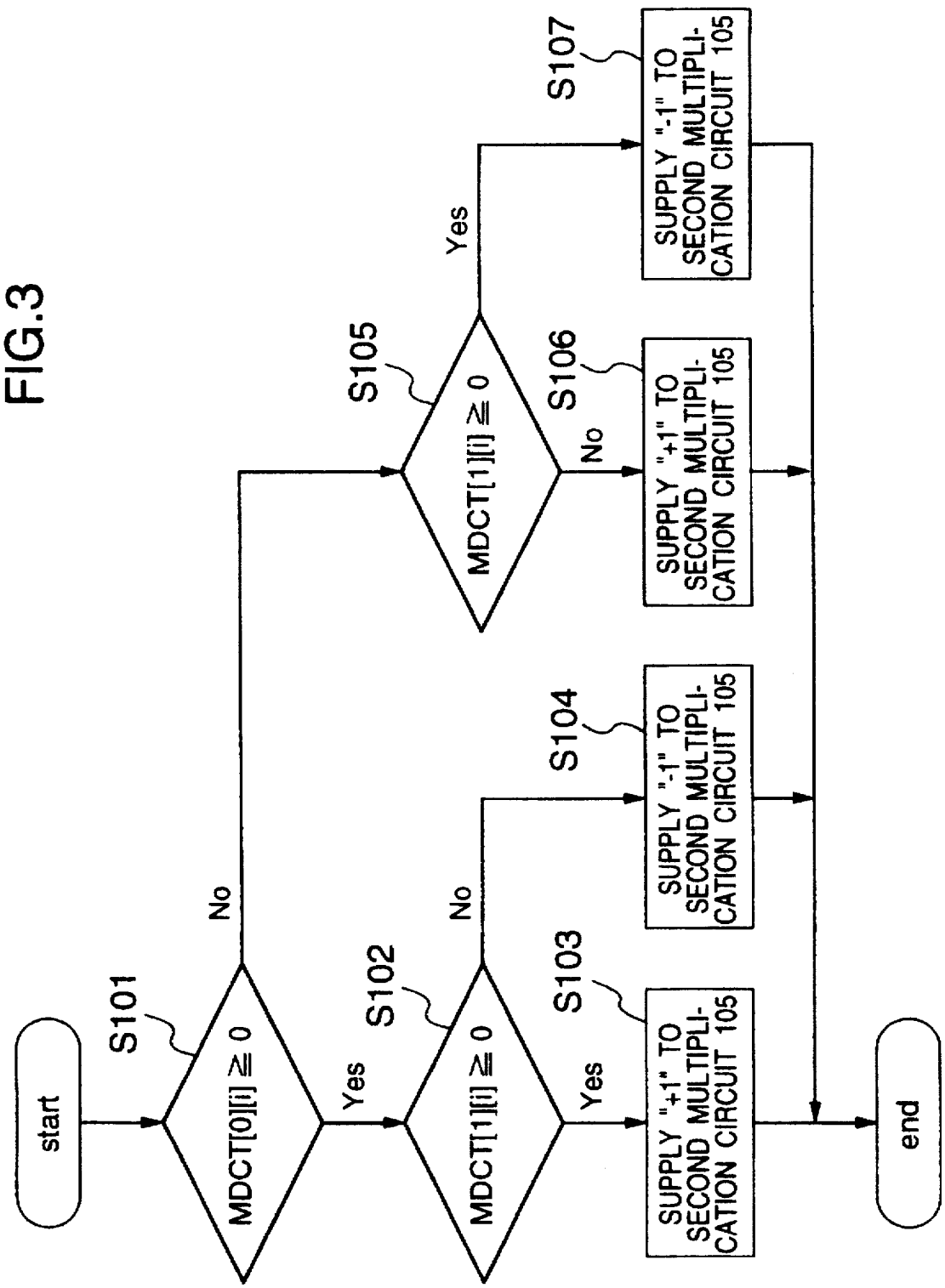
FIG. 3 is a flow chart for illustrating, by way of an example, operation of a sign inverting circuit shown in FIG. 2.

When the averaged MDCT coefficient data of the frequency i is represented by JC[i], then the shared-channel data JC[i] can be expressed as follows:

In the case of the processing conforming to the flow chart shown in FIG. 3:

When MDCT[0][i]≧0 and when MDCT[1][i]≧0, then JC[i]= (MDCT[0][i]+MDCT[1][i])/2    (1)

When MDCT[0][i]<0 and when MDCT[1][i]<0, then JC[i]= (MDCT[0][i]+MDCT[1][i])/2    (2)

When MDCT[0][i]>0 and when MDCT[1][i]<0, then JC[i]= (MDCT[0][i]−MDCT[1][i])/2    (3)

When MDCT[0][i]<0 and when MDCT[1][i]≧0, then JC[i]= (MDCT[0][i]−MDCT[1][i])/2    (4)

Figure 4:
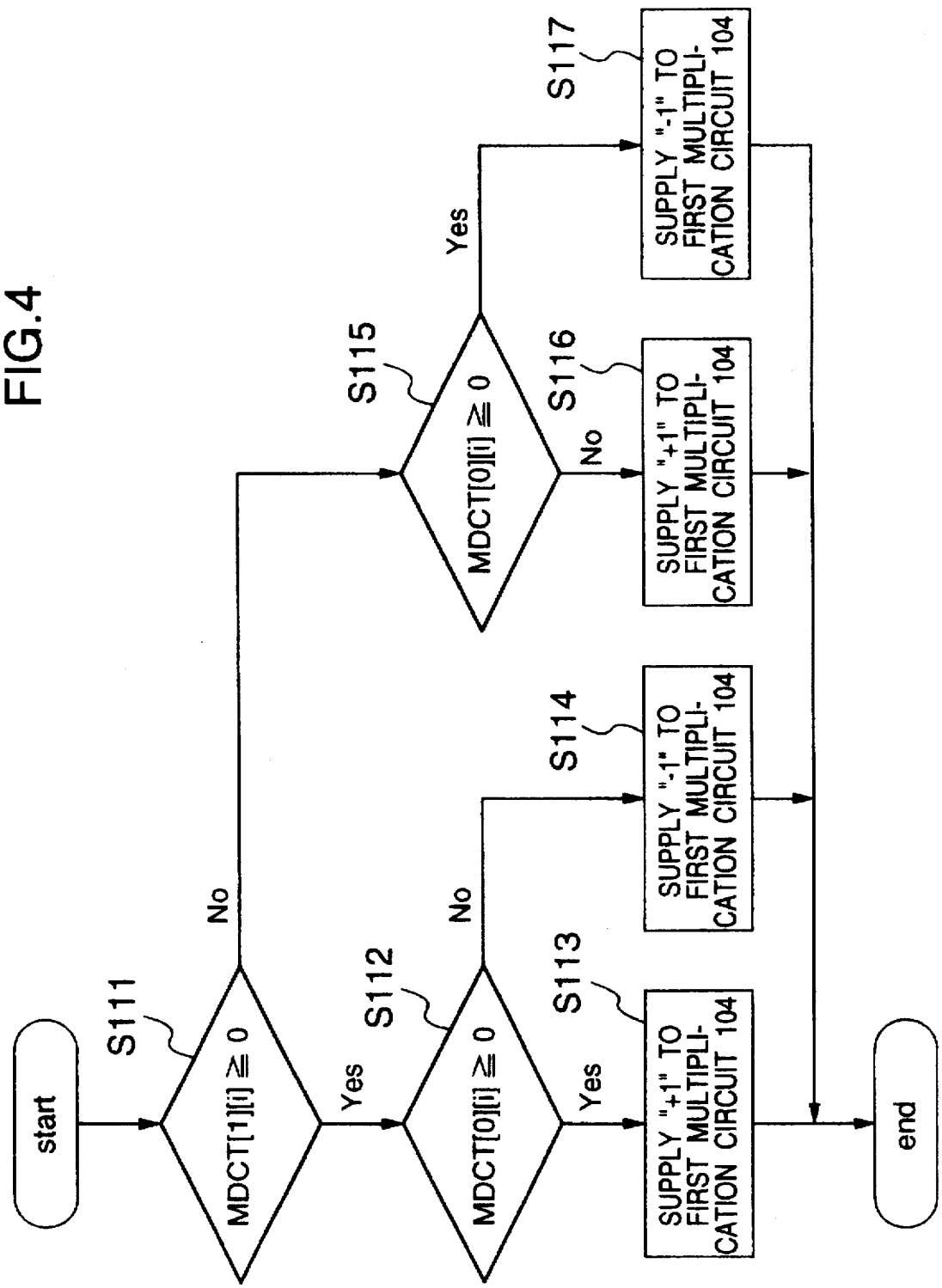
FIG. 4 is a flow chart for illustrating another example of operation of the sign inverting circuit shown in FIG. 2.

On the other hand, in the case of the processing conforming to the flow chart shown in FIG. 4:

When MDCT[0][i]≧0 and when MDCT[1][i]≧0, then JC[i]= (MDCT[0][i]+MDCT[1][i])/2    (5)

When MDCT[0][i]<0 and when MDCT[1][i]<0, then JC[i]= (MDCT[0][i]+MDCT[1][i])/2    (6)

When MDCT[0][i]≧0 and when MDCT[1][i]<0, then JC[i]=(− MDCT[0][i]+MDCT[1][i])/2    (7)

When MDCT[0][i]<0 and when MDCT[1][i]≧0, then JC[i]=(− MDCT[0][i]+MDCT[1][i])/2    (8)

By virtue of the processings described above, the averaged MDCT coefficient data can be prevented from taking a value approximating to 0 (zero) even when the right-channel MDCT coefficient data and the left-channel MDCT coefficient data have respective absolute values substantially equal to each other and the signs which differ from each other.

The sign inversion information indicating whether or not the data of "−1" has been supplied to the first multiplication circuit 104 and the second multiplication circuit 105 is outputted externally from the sign inverting circuit 103 through the sign inversion information output terminal 11 (see FIG. 1). The sign inversion information may be stored on a recording medium and/or transmitted through a transmission path.

The right-channel MDCT coefficient data inputted to the first channel MDCT coefficient data input terminal 101 are divided by the averaged MDCT coefficient data in the second division circuit 108 to be thereby converted to corrected values of the right-channel MDCT coefficient data. Similarly, the left-channel MDCT coefficient data inputted to the second channel MDCT coefficient data input terminal 102 are divided by the averaged MDCT coefficient data in the third division circuit 109 to be thereby converted to corrected values of the left-channel MDCT coefficient data. In this conjunction, when the corrected value of the right channel MDCT coefficient data and that of the left-channel MDCT coefficient data are represented by ADC[j][i], then the following expression holds true:

$$ADC[j][i]=MDCT[j][i]/JC[i] \quad (9)$$

where j=0, 1 and i=0, 1, 2, . . . , 239.

Parenthetically, it can be ensured that the corrected values ADC[0][i] of the right-channel MDCT coefficient data always assumes a value of plus sign when the first multiplication circuit 104 is supplied with only the data of "+1". Similarly, it is guaranteed that the corrected values ADC[1][i] of the left-channel MDCT coefficient data always assume a value of plus sign when the second multiplication circuit 105 is supplied with only the data of "+1".

The corrected values of the right-channel MDCT coefficient data are averaged within each sub-band by means of the first averaging circuit 110 to be outputted from the first channel sharing information output terminal 112 as one right channel shared information for each sub-band i.e., on a sub-band basis. Similarly, the corrected values of the left-channel MDCT coefficient data are averaged within each sub-band by means of the second averaging circuit 111 to be outputted from the second channel sharing information output terminal 113 as one left channel shared information for each sub-band i.e., on a sub-band basis. The right channel shared information and the left channel shared information may then undergo, for example, a time division processing to be outputted externally from the channel sharing information output terminal 8 (see FIG. 1). The right channel shared information and the left channel shared information are stored on a recording medium and/or transmitted through a transmission path.

At this juncture, when the right channel shared information and the left channel shared information in a k-th sub-band covering frequencies from s to e are represented by JCI[j][k], then the following expression applies valid:

$$JCI[j][k] = \sum_{i=s}^{e} (ADC[j][i])/(e-s) \quad (10)$$

In this conjunction, it should be recalled that when the first multiplication circuit 104 is supplied with only the data of "+1", the right channel shared information JCI[0][k] is ensured to assume constantly the values of plus sign. Thus, it is possible to reduce the quantity of bits to be assigned to the channel shared information. Similarly, because it is guaranteed that the left channel shared information JCI[1][k] always assumes values of plus sign when the second multiplication circuit 105 is supplied with only the data of "+1", the quantity Of bits to be assigned to the channel shared information can be reduced.

Figure 5:
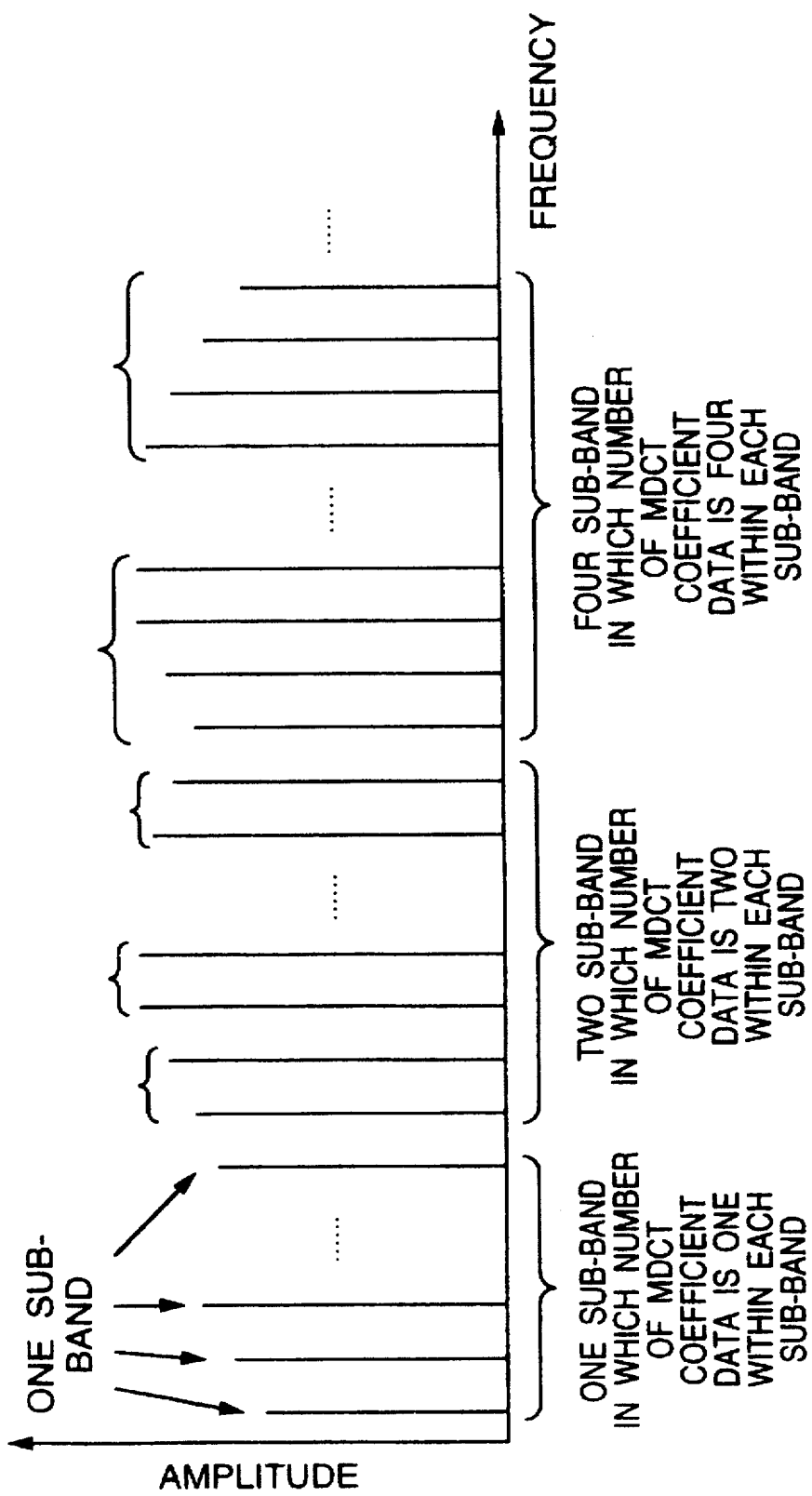
FIG. 5 is a view for illustrating sub-bands.

Hereat, description will be made briefly of the sub-bands by reference to FIG. 5. The 240 right-channel MDCT coefficient data is sequentially divided, starting from the zero frequency, into 16 sub-bands in each of which the number of the right-channel MDCT coefficient data is 1 (one), 16 sub-bands in each of which the number of the right-channel MDCT coefficient data is 2 (two), 16 sub-bands in each of which the number of the right-channel MDCT coefficient data is 4 (four), and 16 sub-bands in each of which the right-channel MDCT coefficient data is 8 (eight). The 240 left-channel MDCT coefficient data is divided into sub-bands in a similar manner.

In the floating-point transform circuit 5, the averaged MDCT coefficient data inputted thereto from the channel sharing circuit 100 undergoes a floating-point transform processing so that the averaged MDCT coefficient data are transformed to one subband-common exponent data and one or plural mantissa data for one sub-band. More specifically, in the case of the example of the sub-band division illustrated in FIG. 5, following data transform processings are executed.

(a) In each of the sixteen sub-bands in each of which the number of the right-channel MDCT coefficient data and that of the left-channel MDCT coefficient data are, respectively, one, the averaged MDCT coefficient data are subject to the floating-point transform processing straightforwardly to be thereby transformed to one subband-common exponent data and one mantissa data.

(b) In the other sub-bands, such averaged MDCT coefficient data which has the greatest absolute value is detected from a plurality of the averaged MDCT coefficient data contained in one sub-band. The averaged MDCT coefficient data as detected is transformed into a floating-point data F which is given by the following expression (11):

$$F = M \times 2^{-N} \tag{11}$$

where M represents mantissa data, wherein $0.5 \leq M \leq 1, -1 \leq M \leq -0.5$, and N represents exponent data, wherein N is a positive integer.

The other averaged MDCT coefficient data contained within one sub-band is divided by the exponent part $2^{-N}$ of the floating-point data F, wherein result of the division represents the mantissa data. In this manner, the averaged MDCT coefficient data which is present within one sub-band are transformed into one subband-common exponent data and a number of mantissa data which number is equal to that of the averaged MDCT coefficient data contained in the sub-band under consideration.

In the bit allocating circuit 6, the quantizing bit length L for the mantissa data is determined by using the subband-common exponent data inputted from the floating-point transform circuit 5 while taking advantage of the psychoacoustic masking properties of a man. The quantizing bit length L as determined is inputted to the quantizing circuit 7.

In the quantizing circuit 7, the mantissa data inputted from the floating-point transform circuit 5 is transformed into mantissa part quantization data having the number of bits corresponding to the quantizing bit length L as counted from the MSB (Most Significant Bit). In more concrete, assuming, by way of example, that the quantizing bit length L as determined is "2" and that the mantissa data is "1100101", then the mantissa data is converted to the mantissa part quantization data "11" consisting of two bits as counted from the most significant bit or MSB.

The subband-common exponent data outputted from the floating-point transform circuit 5 is outputted externally from the subband-common mantissa data output terminal 9, while the mantissa part quantization data outputted from the quantizing circuit 7 is outputted externally from the quantized mantissa data output terminal 10. The subband-common exponent data and the mantissa part quantization data are stored on a recording medium and/or transmitted through a transmission path.

Next, referring to FIG. 6, a digital audio data encoding apparatus implementing the digital data encoding apparatus according to the present invention as a second embodiment thereof will be described.

The digital audio data encoding apparatus according to the second embodiment differs from the digital audio data encoding apparatus according to the first embodiment shown in FIG. 1 in that a channel sharing/non-sharing decision circuit 21, a switch circuit 22 and a selection information output terminal 23 are provided. More specifically, in the case of the digital audio data encoding apparatus according to the instant embodiment, only when the value of correlation between the right-channel MDCT coefficient data and the left-channel MDCT coefficient data is greater than a predetermined value, the right-channel MDCT coefficient data and the left-channel MDCT coefficient data are shared in respect to the channel. In the following, operations of the channel sharing/non-sharing decision circuit 21 and the switch circuit 22 will be described.

Inputted to the channel sharing/non-sharing decision circuit 21 are the right/left-channel MDCT coefficient data MDCT[j][i] from the MDCT circuit 3 and additionally the right/left-channel MDCT coefficient data corrected values ADC[j][i] and the channel sharing information JCI[j][k] from the channel sharing circuit 100. In the channel sharing/non-sharing decision circuit 21, a variance AADC[k] (k=0, 1, . . . . , 63) of the corrected values ADC[j][i] (i=s to e) of the right-channel MDCT coefficient data and the left-channel MDCT coefficient data existing in the k-th sub-band is arithmetically determined in accordance with the following expression:

$$AADC[k] = \sum_{j=0}^{1} \left\{ \sum_{i=s}^{e} (DADC[j][i] \times DADC[j][i])/(e-s) \right\} \tag{12}$$

where DADC[j][i] represents differences between the corrected values ADC[j][i] (i=s to e) of the right-channel MDCT coefficient data and the left-channel MDCT coefficient data contained in the k-th sub-band and the channel sharing information JCI[j][k], which difference can be given by the following expression:

$$DADC[j][i] = ADC[j][i] - JCI[j][k] \tag{13}$$

Subsequently, on the basis of the variance AADC[k] as determined, a correlation value C[k] for the k-th sub-band is calculated in accordance with the following expression:

$$C[k] = AADC[k] / \sum_{j=0}^{1} (JCI[j][k] \times JCI[j][k]) \qquad (14)$$

In this conjunction, it is noted that the degree of correlation is smallest when the correlation value C[k]=1 (one), while the degree of correlation is greatest when the correlation value C[k]=0 (zero) (i.e., in the case where ADC[3][i]=JCI [j][k]).

When the degree of correlation is small, this means that the difference between the right/left-channel MDCT coefficient data corrected values ADC[j][i] and the channel sharing information JCI[j][k] is great. Consequently, error (JCI [j][k]×JC[3]−MDCT[j][i]) involved in restructuring the MDCT coefficient data MDCT[j][i] for each channel from the channel sharing information JCI[j][k] and the averaged MDCT coefficient data JC[j] at the side of the decoder becomes large, giving rise to degradation in the tone quality. On the other hand, when the degree of correlation is great, the error mentioned above is small, whereby the tone quality suffers substantially no degradation.

For the reason mentioned above, when the correlation value C[k] as obtained is smaller than 0.1 inclusive thereof, a control signal is outputted from the channel sharing/non-sharing decision circuit 21 to the switch circuit 22 for commanding the switch circuit 22 to select the averaged MDCT coefficient data JC[j] inputted from the channel sharing circuit 100 for thereby outputting it to the floating-point transform circuit 5. On the other hand, when the correlation value C[k] obtained is greater than 0.1, a control signal is outputted from the channel sharing/non-sharing decision circuit 21 to the switch circuit 22 for commanding the switch circuit 22 to select the right/left-channel MDCT coefficient data MDCT[j][i] inputted from the MDCT circuit 3 for thereby outputting it to the floating-point transform circuit 5. In that case, selection information indicating which of the averaged MDCT coefficient data JC[j] and the right/left-channel MDCT coefficient data MDCT[j][i] has been selected is outputted externally via the selection information output terminal 23 from the channel sharing/non-sharing decision circuit 21.

Parenthetically, the floating-point transform processing executed by the floating-point transform circuit 5 upon selection of the right/left-channel MDCT coefficient data MDCT[j][i] by the switch circuit 22 is performed similarly in the case of the averaged MDCT coefficient data JC[j].

Next, a digital audio data encoding apparatus implementing the digital data encoding apparatus according to the present invention as a third embodiment thereof will be described by reference to FIG. 7.

Figure 6:
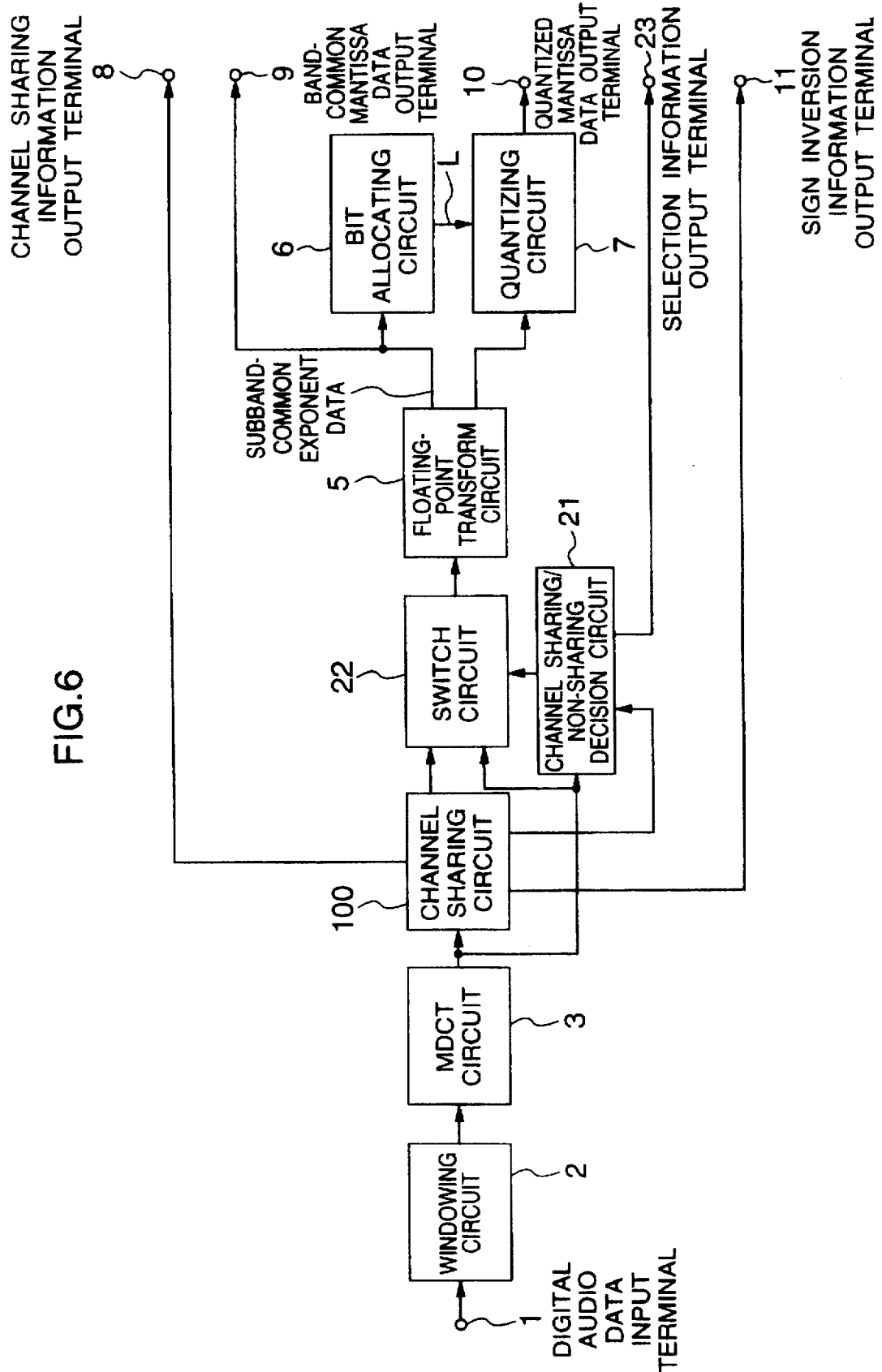
FIG. 6 is a block diagram showing a digital audio data encoding apparatus as an exemplary mode for implementing the digital data encoding apparatus according to a second embodiment of the present invention.
Figure 7:
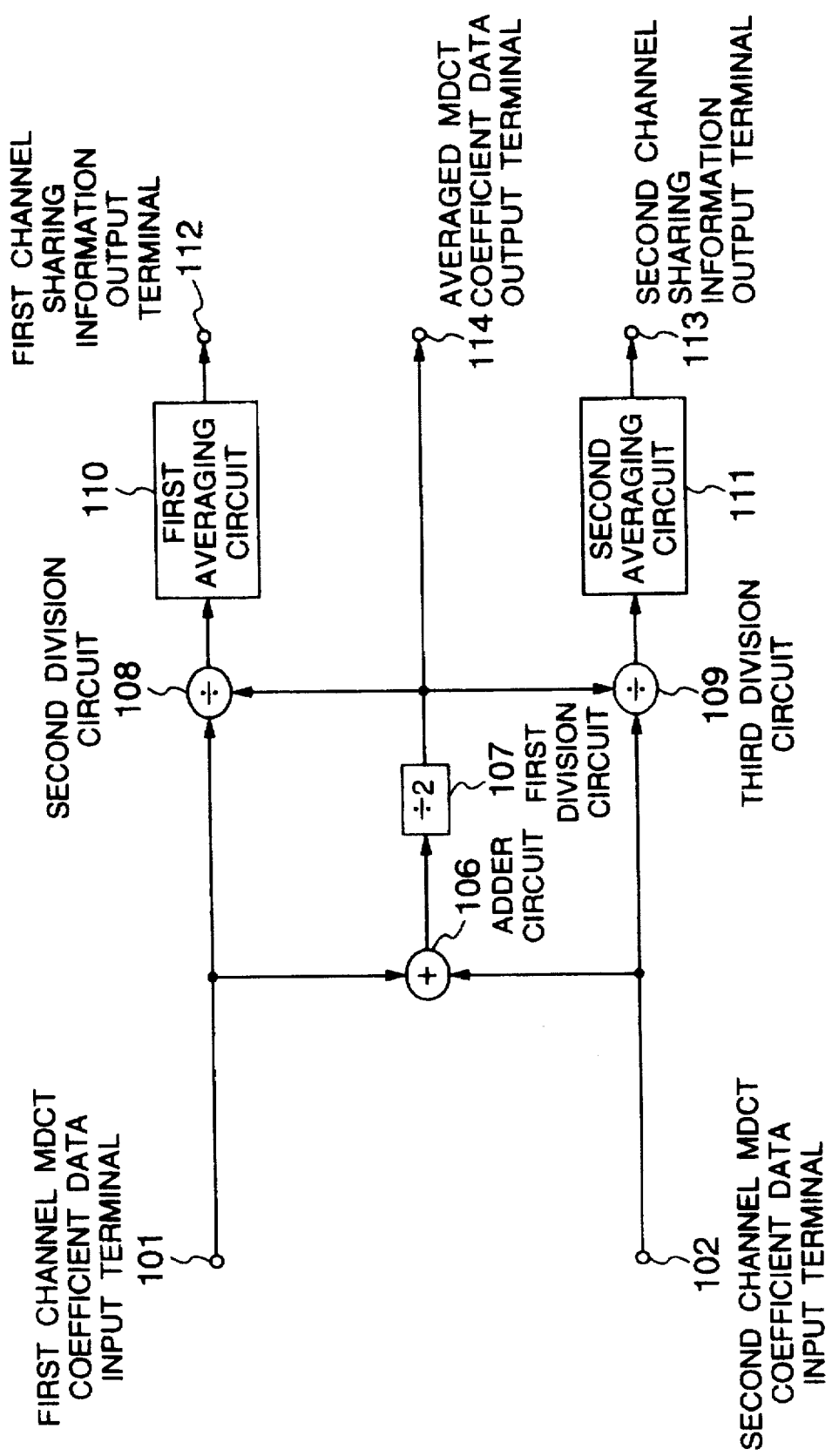
FIG. 7 is a block diagram showing a channel sharing circuit incorporated in a digital audio data encoding apparatus implementing the digital data encoding apparatus as a third embodiment of the present invention.

The digital audio data encoding apparatus according to the instant embodiment differs from the digital audio data encoding apparatus according to the second embodiment shown in FIG. 6 in that the channel sharing circuit 100 is implemented in such configuration as shown in FIG. 7.

Figure 2:
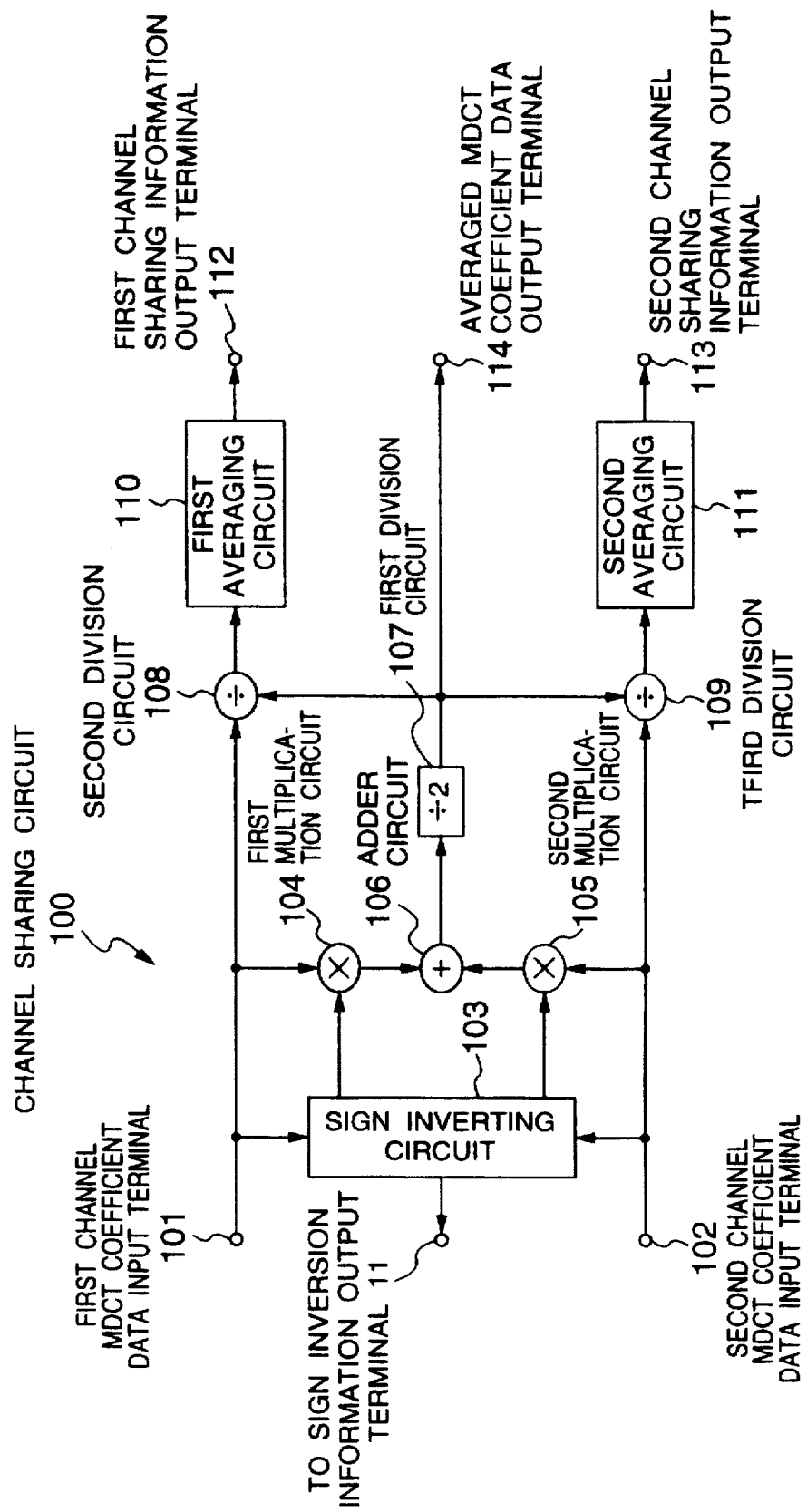
FIG. 2 is a block diagram of a channel sharing circuit shown in FIG. 1.

More specifically, the channel sharing circuit shown in FIG. 7 differs from the channel sharing circuit shown in FIG. 2 in that the sign inverting circuit 103, the first multiplication circuit 104 and the second multiplication circuit 105 are spared. Thus, with the digital audio data encoding apparatus according to the instant embodiment, the averaged MDCT coefficient data can be generated without need for making the signs of the right-channel MDCT coefficient data and the left-channel MDCT coefficient data coincide with each other in the channel sharing circuit. Nevertheless, because of the provision of the channel sharing/non-sharing decision circuit 21 and the switch circuit 22, degradation in the tone quality at the decoder side due to a small degree of correlation can be prevented as in the case of the digital audio data encoding apparatus according to the second embodiment.

As other modes for implementing the digital data encoding apparatus according to the present invention, there may be enumerated those mentioned below.

(a) In the foregoing, it has been described that the data of "+1" or the data of "−1" is outputted from the sign inverting circuit 103 (see FIG. 2) to the first multiplication circuit 104 or the second multiplication circuit 105 on a frequency-by-frequency basis. However, such arrangement may be adopted that the data of "+1" or the data of "−1" is outputted from the sign inverting circuit 103 to the first multiplication circuit 104 or the second multiplication circuit 105 on a sub-band basis (i.e., on a subband-by-subband basis).

(b) Although it has been described that the subband-common exponent data is determined by the floating-point transform circuit 5 on the sub-band basis, the exponent data may be determined on a frequency-by-frequency basis.

(c) In the expression (11), the floating-point data F is expressed by "M×2$^{-N}$". However, similar processing can be performed by expressing the floating-point data F as "M×r$^{-N}$" (where r is an integer greater than "3" inclusive).

(d) In the foregoing, it has been described that when the correlation value C[k] obtained is smaller than 0.1 inclusive thereof, the averaged MDCT coefficient data JC[j] is selected, while when correlation value C[k] obtained is greater than 0.1, the right and left-channel MDCT coefficient data are selected. However, as a value of the reference for the selection, other values than "0.1" may be adopted in dependence on the degree of tone quality at the decoder side.

(e) Although the foregoing description is directed to the encoding of the digital audio data, the invention can equally find application to the encoding of other digital data than the digital audio data.

What is claimed is:

1. A digital data encoding apparatus for encoding first channel digital data divided into blocks each containing a predetermined number of samples and second channel digital data divided into blocks each containing said predetermined number of samples, comprising:

coefficient data generating means for transforming said first channel digital data into data on a frequency axis on a block-by-block basis to thereby generate first channel coefficient data on a frequency-by-frequency basis while transforming said second channel digital data into data on the frequency axis on a block-by-block basis to thereby generate second channel coefficient data on a frequency-by-frequency basis;

sign inverting means for detecting on a frequency-by-frequency basis whether or not sign of said first channel coefficient data coincides with sign of said second channel coefficient data, wherein unless the sign of said first channel coefficient data coincides with the sign of said second channel coefficient data, said sign inverting means inverting either the sign of said first channel coefficient data or the sign of said second channel coefficient data, to thereby make the sign of said first channel coefficient data coincide with the sign of said second channel coefficient data;

channel sharing means for determining mean values of said first channel coefficient data and said second channel coefficient data both of which have the respective signs made to coincide with each other by said sign inverting means, to thereby generate shared-channel data; and floating-point transform means supplied with said shared-channel data as input thereto from said channel sharing means, for dividing said inputted shared-channel data into a plurality of sub-bands each containing a single or a plurality of said inputted shared-channel data, to allow said divided shared-channel data to undergo a floating-point transform on a subband basis for thereby generating a single subband-common exponent data, which is common to said divided shared-channel data contained in each of said sub-bands, and mantissa data the number of which is equal to the number of said divided shared-channel data contained in each of said sub-bands.

2. A digital data encoding apparatus set forth in claim 1, wherein said digital data is digital audio data, and said coefficient data generating means performs a modified discrete cosine transform on said first and second channel digital data on a block-by-block basis to thereby generate said first and second channel coefficient data, respectively.

3. A digital data encoding apparatus set forth in claim 1, wherein said floating-point transform means divides said inputted shared-channel data in such manner that said sub-band of higher frequency contains a correspondingly greater number of said shared-channel data.

4. A digital data encoding apparatus for encoding first channel digital data divided into blocks each containing a predetermined number of samples and second channel digital data divided into blocks each containing said predetermined number of samples, comprising:

coefficient data generating means for transforming said first channel digital data into data on a frequency axis on a block-by-block basis, to thereby generate first channel coefficient data on a frequency-by-frequency basis while transforming said second channel digital data into data on the frequency axis on a block-by-block basis to thereby generate second channel coefficient data on a frequency-by-frequency basis;

channel sharing means for determining mean values of said first channel coefficient data and said second channel coefficient data to thereby generate shared-channel data;

channel sharing/non-sharing decision means for determining a degree of correlation between said first channel coefficient data and said second channel coefficient data to thereby make decision as to which of said shared-channel data and said first and second channel coefficient data is to be selected in dependence on said determined degree of correlation;

switch means for selecting either said shared-channel data inputted from said channel sharing means or said first and second channel coefficient data inputted from said coefficient data generating means in dependence on a result of said decision made by said channel sharing/non-sharing decision means, to thereby output as output data either said shared-channel data or said first and second channel coefficient data as selected; and floating-point transform means inputted with said output data outputted from said switch means, for dividing said inputted output data into a plurality of sub-bands each containing a single or a plurality of said inputted output data, while allowing said divided output data to undergo a floating-point transform on a subband basis for thereby generating one subband-common exponent data, which is common to said divided output data contained in each of said sub-bands, and mantissa data the number of which is equal to the number of said divided output data contained in each of said sub-bands.

5. A digital data encoding apparatus set forth in claim 4, wherein said channel sharing/non-sharing decision means determines a degree of correlation between said first channel coefficient data and said second channel coefficient data on a sub-band basis to thereby decide as to which of said shared-channel data and said first and second channel coefficient data is selected in dependence on said degree of correlation determined.

6. A digital data encoding apparatus set forth in claim 4, wherein said digital data is digital audio data, and said coefficient data generating means performs a modified discrete cosine transform on said first and second channel digital data on a block-by-block basis to thereby generate said first and second channel coefficient data, respectively.

7. A digital data encoding apparatus set forth in claim 4, wherein said floating-point transform means divides said inputted output data in such manner that said sub-band of higher frequency contains a correspondingly greater number of said output data.

8. A digital data encoding apparatus for encoding first channel digital data divided into blocks each containing a predetermined number of samples and second channel digital data divided into blocks each containing said predetermined number of samples, comprising:

coefficient data generating means for transforming said first channel digital data into data on a frequency axis on a block-by-block basis to thereby generate first channel coefficient data on a frequency-by-frequency basis while transforming said second channel digital data into data on the frequency axis on a block-by-block basis to thereby generate second channel coefficient data on a frequency-by-frequency basis;

sign inverting means for detecting on a frequency-by-frequency basis whether or not sign of said first channel coefficient data coincides with sign of said second channel coefficient data, wherein unless the sign of said first channel coefficient data coincides with the sign of said second channel coefficient data, said sign inverting means inverting either the sign of said first channel coefficient data or the sign of said second channel coefficient data, to thereby make the sign of said first channel coefficient data coincide with the sign of said second channel coefficient data;

channel sharing means for determining mean values of said first channel coefficient data and said second channel coefficient data both of which have the respective signs made to coincide with each other by said sign inverting means, to thereby generate shared-channel data;

channel sharing/non-sharing decision means for determining a degree of correlation between said first channel coefficient data and said second channel coefficient data to thereby make decision as to which of said shared-channel data and said first and second channel coefficient data is to be selected in dependence on said determined degree of correlation;

switch means for selecting either said shared-channel data inputted from said channel sharing means or said first and second channel coefficient data inputted from said coefficient data generating means in dependence on a result of said decision made by said channel sharing/ non-sharing decision means, to thereby output as output data either said shared-channel data or said first and second channel coefficient data as selected; and floating-point transform means inputted with said output data from said switch means, for dividing said inputted output data into a plurality of sub-bands each containing a single or a plurality of said inputted output data, while allowing said divided output data to undergo a floating-point transform on a subband basis for thereby generating one subband-common exponent data, which is common to said divided output data contained in each of said sub-bands, and mantissa data, the number of which is equal to the number of said divided output data contained in each of said sub-bands.

9. A digital data encoding apparatus set forth in claim 8, wherein said channel sharing/non-sharing decision means determines a degree of correlation between said first channel coefficient data and said second channel coefficient data on a sub-band basis to thereby decide as to which of said shared-channel data and said first and second channel coefficient data is selected in dependence on said degree of correlation determined.

10. A digital data encoding apparatus set forth in claim 8, wherein said digital data is digital audio data, and said coefficient data generating means performs a modified discrete cosine transform on said first and second channel digital data on a block-by-block basis to thereby generate said first and second channel coefficient data, respectively.

11. A digital data encoding apparatus set forth in claim 8, wherein said floating-point transform means divides said inputted output data in such manner that said sub-band of higher frequency contains a correspondingly greater number of said output data.

12. A digital data encoding method for encoding first channel digital data divided into blocks each containing a predetermined number of samples and second channel digital data divided into blocks each containing said predetermined number of samples, comprising:

a first coefficient data generating step of transforming said first channel digital data into data on a frequency axis on a block-by-block basis to thereby generate first channel coefficient data on a frequency-by-frequency basis;

a second coefficient data generating step of transforming said second channel digital data into data on the frequency axis on a block-by-block basis to thereby generate second channel coefficient data on a frequency-by-frequency basis;

a sign inverting step of detecting on a frequency-by-frequency basis whether or not sign of said first channel coefficient data coincides with sign of said second channel coefficient data, wherein unless the sign of said first channel coefficient data coincides with the sign of said second channel coefficient data, either the sign of said first channel coefficient data or the sign of said second channel coefficient data is inverted, to thereby make the sign of said first channel coefficient data coincide with the sign of said second channel coefficient data;

a channel sharing step of determining mean values of said first channel coefficient data and second channel coefficient data both of which have the respective signs made to coincide with each other, to thereby generate shared-channel data; and a floating-point transform step of dividing said shared-channel data into a plurality of sub-bands each containing a single or a plurality of said inputted shared-channel data, to allow said divided shared-channel data to undergo a floating-point transform on a subband basis for thereby generating one subband-common exponent data, which is common to said divided shared-channel data contained in each of said sub-bands, and mantissa data the number of which is equal to the number of said divided shared-channel data contained in each of said sub-bands.

13. A digital data encoding method set forth in claim 12, wherein said digital data is digital audio data, and in each of said first and second coefficient data generating steps, a modified discrete cosine transform is performed on said first and second channel digital data on a block-by-block basis to thereby generate said first and second channel coefficient data, respectively.

14. A digital data encoding method set forth in claim 12, wherein in said floating-point transform step, said shared-channel data are divided in such manner that said sub-band of higher frequency contains a correspondingly greater number of said shared-channel data.

15. A digital data encoding method for encoding first channel digital data divided into blocks each containing a predetermined number of samples and second channel digital data divided into blocks each containing said predetermined number of samples, comprising:

a first coefficient data generating step of transforming said first channel digital data into data on a frequency axis on a block-by-block basis to thereby generate first channel coefficient data on a frequency-by-frequency basis;

a second coefficient data generating step of transforming said second channel digital data into data on the frequency axis on a block-by-block basis to thereby generate second channel coefficient data on a frequency-by-frequency basis;

a channel sharing step of determining mean values of said first channel coefficient data and said second channel coefficient, to thereby generate shared-channel data;

a channel sharing/non-sharing decision step of determining a degree of correlation between said first channel coefficient data and said second channel coefficient data to thereby make decision as to which of said shared-channel data and said first and second channel coefficient data is to be selected in dependence on said determined degree of correlation;

a switch step of selecting either said shared-channel data or said first and second channel coefficient data in dependence on a result of said decision made by said channel sharing/non-sharing decision step, to thereby output as output data either said shared-channel data or said first and second channel coefficient data as selected; and a floating-point transform step of dividing said output data into a plurality of sub-bands each containing a single or a plurality of said output data, to allow said divided output data to undergo a floating-point transform on a subband basis for thereby generating one subband-common exponent data, which is common to said divided output data contained in each of said sub-bands, and mantissa data the number of which is equal to the number of said divided output data contained in each of said sub-bands.

16. A digital data encoding method set forth in claim 15, wherein in said channel sharing/non-sharing decision step, a degree of correlation between said first channel coefficient data and said second channel coefficient data is determined on a sub-band basis to thereby decide which of said shared-channel data and said first and second channel coefficient data is to be selected in dependence on said degree of correlation determined.

17. A digital data encoding method set forth in claim 15, wherein said digital data is digital audio data, and in said first and second coefficient data generating step, a modified discrete cosine transform is performed on said first and second channel digital data on a block-by-block basis to thereby generate said first and second channel coefficient data, respectively.

18. A digital data encoding method set forth in claim 15, wherein in said floating-point transform step, said inputted output data is divided in such manner that said sub-band of higher frequency contains a correspondingly greater number of said output data.

19. A digital data encoding method for encoding first channel digital data divided into blocks each containing a predetermined number of samples and second channel digital data divided into blocks each containing said predetermined number of samples, comprising:

a first coefficient data generating step of transforming said first channel digital data into data on a frequency axis on a block-by-block basis to thereby generate first channel coefficient data on a frequency-by-frequency basis;

a second coefficient data generating step of transforming said second channel digital data into data on the frequency axis on a block-by-block basis to thereby generate second channel coefficient data on a frequency-by-frequency basis;

a sign inverting step of detecting on a frequency-by-frequency basis whether or not sign of said first channel coefficient data coincides with sign of said second channel coefficient data, wherein unless the sign of said first channel coefficient data coincides with the sign of said second channel coefficient data, either the sign of said first channel coefficient data or the sign of said second channel coefficient data is inverted, to thereby make the sign of said first channel coefficient data coincide with the sign of said second channel coefficient data;

a channel sharing step of determining mean values of said first channel coefficient data and said second channel coefficient data both of which have the respective signs made to coincide with each other, to thereby generate shared-channel data;

a channel sharing/non-sharing decision step of determining a degree of correlation between said first channel coefficient data and said second channel coefficient data to thereby decide which of said shared-channel data and said first and second channel coefficient data is to be selected in dependence on said determined degree of correlation;

a switching step of selecting either said shared-channel data or said first and second channel coefficient data in dependence on a result of said decision made in said channel sharing/non-sharing decision step, to thereby output as output data either said shared-channel data or said first and second channel coefficient data as selected; and a floating-point transform step of inputting said outputted data and dividing said output data into a plurality of sub-bands each containing a single or a plurality of said output data, to allow said divided output data to undergo a floating-point transform on a subband basis for thereby generating one subband-common exponent data, which is common to said divided output data contained in each of said sub-bands, and mantissa data the number of which is equal to the number of said divided output data contained in each of said sub-bands.

20. A digital data encoding method set forth in claim 19, wherein in said channel sharing/non-sharing decision step, a degree of correlation between said first channel coefficient data and said second channel coefficient data is determined on a sub-band basis to thereby decide which of said shared-channel data and said first and second channel coefficient data is to be selected in dependence on said degree of correlation determined.

21. A digital data encoding method set forth in claim 19, wherein said digital data is digital audio data, and in said first and second coefficient data generating step, a modified discrete cosine transform is performed on said first and second channel digital data on a block-by-block basis to thereby generate said first and second channel coefficient data, respectively.

22. A digital data encoding method set forth in claim 19, wherein in said floating-point transform step, said inputted output data is divided in such manner that said sub-band of higher frequency contains a correspondingly greater number of said output data.

* * * * *